(12) United States Patent
Mengle et al.

(10) Patent No.: US 9,276,855 B1
(45) Date of Patent: Mar. 1, 2016

(54) SYSTEMS AND METHODS FOR PROVIDING NAVIGATION FILTERS

(71) Applicant: Google Inc., Mountain View, CA (US)

(72) Inventors: Advay Mengle, Sunnyvale, CA (US); Shreyas Doshi, Mountain View, CA (US); Venky Ramachandran, Cupertino, CA (US); Guarav Garg, San Francisco, CA (US)

(73) Assignee: Google Inc., Mountain View, CA (US)

(*) Notice: Subject to any disclaimer, the term of this patent is extended or adjusted under 35 U.S.C. 154(b) by 274 days.

(21) Appl. No.: 13/943,608

(22) Filed: Jul. 16, 2013

(51) Int. Cl.
  *G06F 15/173* (2006.01)
  *H04L 12/70* (2013.01)
(52) U.S. Cl.
  CPC ...................................... *H04L 47/00* (2013.01)
(58) Field of Classification Search
  CPC ....... G06Q 10/10; G06Q 50/24; G06Q 50/22; B60N 2/002
  See application file for complete search history.

(56) References Cited

U.S. PATENT DOCUMENTS

| | | | |
|---|---|---|---|
| 6,269,362 B1* | 7/2001 | Broder et al. | |
| 2002/0156688 A1* | 10/2002 | Horn et al. | 705/26 |
| 2003/0167265 A1* | 9/2003 | Corynen | 707/4 |
| 2004/0143600 A1* | 7/2004 | Musgrove et al. | 707/104.1 |
| 2005/0091576 A1* | 4/2005 | Relyea et al. | 715/502 |
| 2005/0091672 A1* | 4/2005 | Debique et al. | 719/328 |
| 2008/0104032 A1* | 5/2008 | Sarkar | 707/3 |
| 2008/0307222 A1* | 12/2008 | Chow et al. | 713/156 |
| 2009/0012984 A1* | 1/2009 | Ravid et al. | 707/101 |
| 2010/0083124 A1* | 4/2010 | Druzgalski et al. | 715/738 |

* cited by examiner

*Primary Examiner* — Peling Shaw
(74) *Attorney, Agent, or Firm* — Foley & Lardner LLP; John D. Lanza

(57) ABSTRACT

Systems and methods for providing navigation filters within content items distributed via a computer network are provided. A navigation filter includes a heading and a plurality of items associated with the heading and can function as a summary of a resource associated with a distributed content item. A described method includes receiving a request for content from a user device, selecting a content item in response to the request, identifying one or more navigation filters associated with the selected content item, generating display data including the selected content item and the one or more navigation filters, and providing the display data for presentation to the user device.

20 Claims, 5 Drawing Sheets

SYSTEMS AND METHODS FOR PROVIDING NAVIGATION FILTERS

BACKGROUND

The Internet provides access to a wide variety of electronic content. Typically, content providers (e.g., advertisers) create third-party content items (e.g., advertisements) which can be presented to a user device via a content slot of an electronic resource. Such third-party content items often direct a web browser operating on the user device to a target resource (e.g., a landing page or website operated by the content provider) when clicked by a user. The target resource can list or link to hundreds of different products, services, or other items. Frequently, the third-party content items include a textual portion (e.g., an ad "creative") designed to capture the attention of a consumer. However, these textual portions often do a poor job of summarizing the content of the target resource.

SUMMARY

One implementation of the present disclosure is a method for providing navigation filters within content items distributed via a computer network. The method includes receiving, at one or more servers, a request for content from a user device and selecting, by the one or more servers, a content item in response to the request. The content item may be configured to direct the user device to a resource upon an interaction with the content item. The method further includes identifying, by the one or more servers, one or more navigation filters associated with the resource. A navigation filter includes a heading and a plurality of items associated with the heading. In some embodiments, the plurality of items are conceptually parallel items which vary along a single dimension of variation. The method further includes generating, by the one or more servers, display data including the selected content item and the one or more navigation filters and providing, by the one or more servers, the display data for presentation to the user device.

Another implementation of the present disclosure is a system for generating navigation filters from a resource. The system includes a data extraction module configured to extract one or more headings and a plurality of items from the resource, the one or more headings and the plurality of items comprising raw textual data. The system further includes a normalization module configured to convert the raw textual data into a standard form. Converting the raw textual data into a standard form may include at least one of removing extraneous punctuation or numbers, trimming whitespace, standardizing casing, and adjusting plurality. The system further includes a filter creation module configured to organize the plurality of items into one or more sets of items and generate one or more navigation filters by associating the one or more sets of items with the one or more headings. Organizing the plurality of items into one or more sets of items may include identifying items which vary along a single dimension and assembling the identified items into a conceptually parallel set. Associating the one or more sets of items with the one or more headings may include identifying a dimension of variation along which the items in a set of conceptually parallel items vary and associating the set of conceptually parallel items with a heading corresponding to the identified dimension of variation.

In some implementations, the system further includes a filter ranking module configured to rank the one or more navigation filters according to ranking criteria. The ranking criteria may be based on at least one of information pertaining to a particular user device and information pertaining to a search query received from the user device.

In some implementations, the system further includes a data import module configured to generate a management interface for receiving information from content providers. The ranking criteria may be received from the content providers via the management interface.

Another implementation of the present disclosure is a method for selecting navigation filters to provide with a content item distributed via a computer network. The method includes receiving, at one or more servers, one or more navigation filters associated with a resource. A navigation filter may include a heading and a plurality of items associated with the heading. In some embodiments, the items are conceptually parallel items which vary along a dimension of variation defined by the heading. The method further includes identifying, by the one or more servers, ranking criteria applicable to the one or more navigation filters. In some implementations, the ranking criteria are based on at least one of information pertaining to a user device to which the content item will be distributed and information pertaining to a search query received from the user device. In some implementations, the ranking criteria are based on a globally ordered list. The method further includes ranking, by the one or more servers, the one or more navigation filters according to the ranking criteria and selecting, by the one or more servers, one or more navigation filters to provide with the content item, according to a result of the ranking.

Ranking the one or more navigation filters may include ranking the headings and the plurality of items associated with the headings. In some implementations, selecting one or more of the top ranking navigation filters includes determining an amount of space available in the content item for displaying the navigation filters, selecting a top ranking heading according to a result of the ranking, and selecting a maximum number of items associated with the top ranking heading. The maximum number of items may be based on the amount of space available in the content item for displaying the navigation filters.

In some implementations, selecting one or more of the top ranking navigation filters includes determining an amount of space available in the content item for displaying the navigation filters, selecting a plurality of top ranking headings according to a result of the ranking, selecting a pair of items associated with each of the top ranking headings, and adding an item to each of the selected pairs of items until the amount of space available in the content item for displaying the navigation filters is filled.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
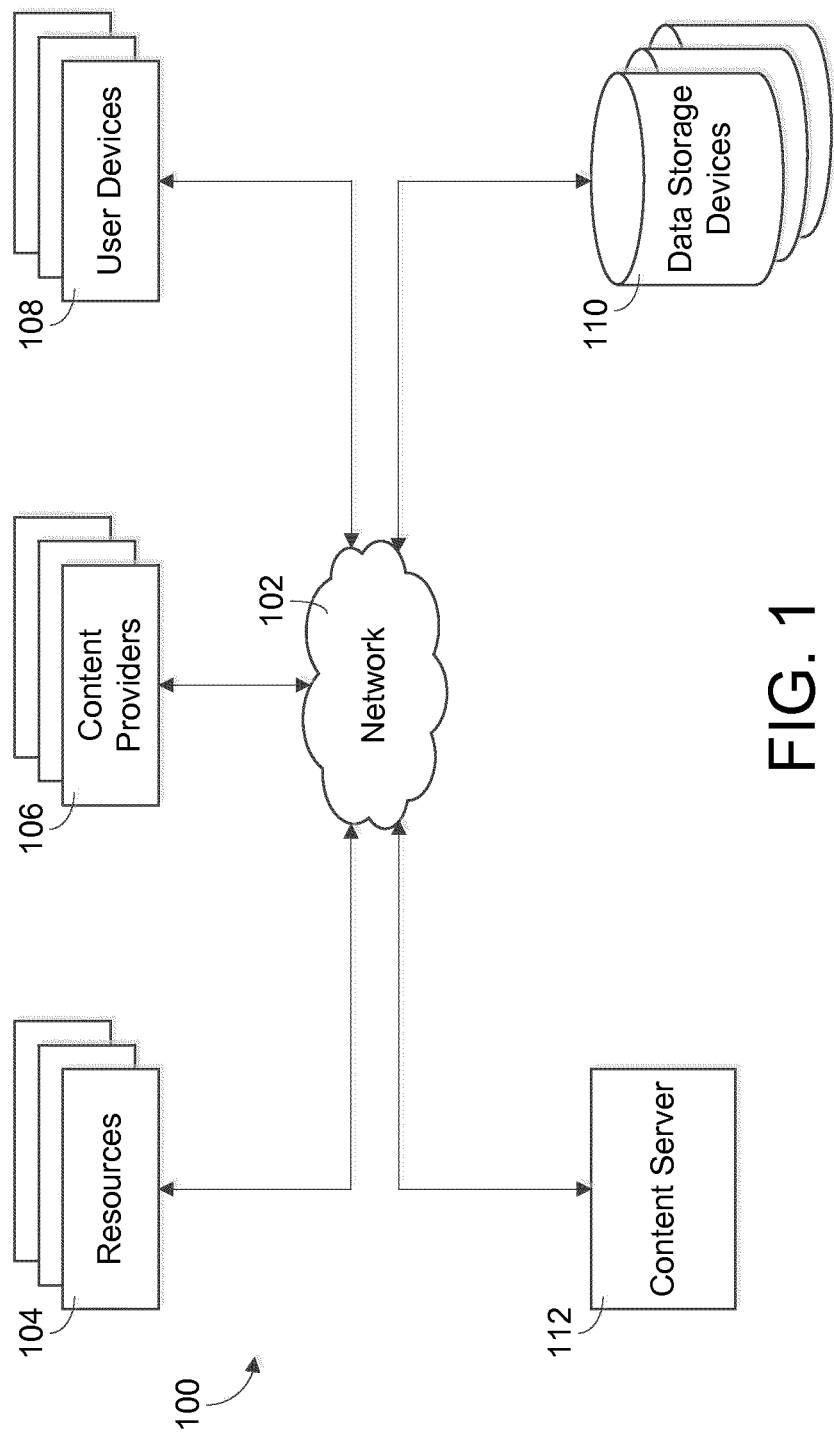
FIG. 1 is a block diagram of a computer system including a network, resources, content providers, user devices, and a content server, shown according to a described implementation.

Referring generally to the FIGURES, systems and methods for providing navigation filters are shown. In a computerized content delivery network, electronic content items (e.g., advertisements) are often distributed from a content server to a plurality of user devices. Content items frequently include embedded hyperlinks which cause user devices to navigate to a target resource (e.g., a landing page) upon interacting with (e.g., clicking) the content items. Navigation filters may be used to summarize the content of a resource and may be integrated with a content item associated with the resource. The content items and the integrated navigation filters may be distributed from the content server to a user device in response to a request for content from the user device. Advantageously, navigation filters may provide a summary of the resource within the content display area of the content item, thereby allowing a user to preview the content available on the resource prior to clicking the content item.

A navigation filter may be a single heading associated with a plurality of conceptually parallel items. A typical resource may list or link to hundreds of different products, services, resources, or other items. Navigation filters may summarize, organize, and present relevant information or links from the resource as a conceptually parallel list within the content (e.g., the "creative" portion) of a content item.

In some implementations, the plurality of items associated with a navigation filter heading may be variations along a single dimension. For example, if a user device submits a search query for "DSLR Cameras," the user device may be distributed a content item associated with a resource through which such cameras can be purchased. The resource could include potentially hundreds of different cameras, and may have categories or attributes which a user can use to further refine the search. One dimension related to a camera is the megapixel capability of the camera. An example navigation filter may have the heading "Megapixels" and a list of items describing variation along the "Megapixels" dimension (e.g., "Less than 5," "5 to 9," "10 and up," etc.). The navigation filters may be presented in a variety of formats including informational lists, hyperlinks to specific portions and/or pages of the resource, and drop-down lists from which a user can select a desired item.

Advantageously, the navigation filters may be automatically extracted from the target resource. The content of the target resource (e.g., a DOM tree, HTML code, a snapshot image, etc.) may be parsed to extract headings and a plurality of items and/or links associated with each heading. The extraction process may involve normalizing the literal text of the target resource to a standard format and performing basic filtering (e.g., discarding links that contain phrases like "see more," "see all," or other non-specific groupings; discarding filters with too many or too few links, etc.). The extraction process may generate many potential navigation filters for a given content item and/or target resource. In other implementations, the navigation filters may be received directly from content providers via a management interface (e.g., used to manage the distribution and attributes of various content items) rather than via automated extraction from the target resource.

In some implementations, the navigation filters may be automatically ranked or filtered to determine which of the potentially applicable navigation filters to integrate with a content item. In some implementations, the ranking may be based on the keywords of a search query which led to the selection of a particular content item (e.g., by a content server) or information associated with the user device from which the request for content is received (e.g., interest categories, behavioral information, etc.). In other implementations, the ranking or filtering may be based on the layout or structure of the target resource. For example, a particular heading or item which is displayed prominently or repeatedly on the target resource may be ranked higher than other items or headings in the list of potentially applicable navigation filters. In some implementations the ranking and filtering may be specified by a content provider rather than via an automated ranking process.

Advantageously, the summary provided by the navigation filters may allow users to preview the content of the target resource before clicking the content item and may allow direct navigation to a desired portion of the target resource from the content item (e.g., by clicking a hyperlinked item in a navigation filter). Navigation filters may facilitate user interaction with distributed content items and may allow users to readily identify the most relevant content in response to a particular search query. Consequently, navigation filters may provide content providers with an improved return on investment (e.g., in a pay-per-click system) by increasing the likelihood that users who click on a particular content item are actually interested in what the target resource has to offer.

Referring now to FIG. 1, a block diagram of a computer system 100 is shown, according to a described implementation. Computer system 100 is shown to include a network 102, resources 104, content providers 106, user devices 108, data storage devices 110, and content server 112. Computer system 100 may facilitate communication between content providers 106, user devices 108, and content server 112. For example, content providers 106 may provide various content items to content server 112 via network 102. Content server 112 may select content items for delivery to user devices 108 based on a request for content received from user devices 108 and deliver the selected content items to user devices 108 via network 102.

Computer system 100 may further facilitate communication between resources 104 and content server 112. For example, content server 112 may receive a URL of a target resource from content providers 106. The URL may be included as part of a content item provided by content providers 106 or received from content providers 106 via a management interface (e.g., used to manage the distribution and attributes of various content items). The URL may specify the location of a landing page located at resources 104. Content server 112 may retrieve resource content from resources 104 and use the resource content to generate a set of navigation filters potentially applicable to a content item. The navigation filters may be filtered and integrated with the content item and distributed along with the content item to user devices 108.

Still referring to FIG. 1, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include resources 104. Resources 104 may include any type of information or data structure that can be provided over network 102. In some implementations, resources 104 may be identified by a resource address associated with each resource (e.g., a resource URL) Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 108) upon viewing resource content.

Resources 104 may include content slots for presenting third-party content items. For example, resources 104 may include one or more inline frame elements (e.g., HTML "iframe" elements, <iframe> . . . </iframe>) for presenting content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items from content server 112 in response to viewing first-party resource content from resources 104.

Resources 104 may include landing pages for various content items. For example, content items received from content providers 106 may have a hyperlink URL (e.g., given by a href attribute) which specifies a location of resources 104. User devices 108 may be directed to resources 104 upon clicking or otherwise interacting with a distributed content item. A target resource may include one or more individual web pages located at resources 104. For example, a target resource may be defined by a domain name having a plurality of web pages. A target resource may include links to other portions of the target resource (e.g., having the same domain) or to other resources. In some implementations, a target resource may be a website associated with (e.g., operated by, controlled by, owned by, etc.) a particular content provider. In some implementations, target resources may provide additional information relating to a product, service, or business featured in a distributed. For example, resources 104 may host a resource through which a product or service featured in the content item may be purchased.

In some implementations, resources 104 may be combined with content providers 106. For example, resources 104 may include data stored on the one or more electronic devices (e.g., computers, servers, etc.) which define content providers 106. In other implementations, resources 104 may be separate from content providers 106. For example, resources 104 may include data stored on a remote server (e.g., FTP servers, file sharing servers, web servers, etc.), combinations of servers (e.g., data centers, cloud computing platforms, etc.), or other data storage devices separate from the devices which define content providers 106.

Still referring to FIG. 1, computer system 100 is shown to include content providers 106. Content providers 106 may include one or more electronic devices representing advertisers, resource operators, business owners, or other entities using the services provided by content server 112. In some implementations, content providers 106 may produce content items (e.g., an ad creative) for presentation to user devices 108. In other implementations, content providers 106 may submit a content generation request to content server 112 and content server 112 may automatically generate a content item in response to the request. The content items may be stored in one or more data storage devices local to content providers 106, within content server 112, or in data storage devices 110.

In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of resources 104 and presented to user devices 108 (e.g., alongside resource content from resources 104).

In some implementations, content providers 106 may submit campaign parameters to content server 112. The campaign parameters may be used to control the distribution of content items to user devices 108. The campaign parameters may include keywords associated with the content items, bids corresponding to the keywords, a content distribution budget, geographic limiters, or other criteria used by content server 112 to determine when a content item may be presented to user devices 108.

Content providers 106 may access content server 112 to monitor the performance of the content items distributed according to the established campaign parameters. For example, content providers 106 may access content server 112 to review one or more performance metrics associated with a content item or set of content items. The performance metrics may describe the interactions between user devices 108 with respect to a distributed content item or set of content items (e.g., number of impressions, number of clicks, number of conversions, revenue, attributable purchases, etc.).

Still referring to FIG. 1, computer system 100 is shown to include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, and/or facilitating user interaction with electronic content (e.g., clicking on a content item, hovering over a content item, etc.). User devices 108 may function as a user agent for viewing HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to the content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106 (e.g., according to established campaign parameters), or by content server 112.

Still referring to FIG. 1, computer system 100 is shown to include data storage devices 110. Data storage devices 110 may be any type of memory device capable of storing profile data, content item data, or any other type of data used by content server 112. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 110 may be local to content server 112 or content providers 106. In other implementations, data storage devices 110 may be remote data storage devices connected with content server 112 via network 102. In some implementations, data storage devices 110 may be part of a data storage server or system capable of receiving and responding to queries from content server 112.

In some implementations, data storage devices 110 store profile data for user devices 108. Profile data may include, for example, interest data, behavioral data, or other data which may be relevant in selecting content items for distribution to user devices 108. Profile data stored in data storage devices 108 may also be used (e.g., by content server 112) to select and/or rank potential navigation filters for inclusion with a content item.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 112. In some implementations, content providers may be provided with similar control options regarding the collection and use of content provider data (e.g., data associated with particular content providers, data extracted from a resource, etc.).

Still referring to FIG. 1, computer system 100 is shown to include a content server 112. Content server 112 may be configured to receive requests for content items from user devices 108 and select an eligible content item in response to the request. The selected content item may be associated with a particular resource (e.g., a landing page) to which a user device is directed (e.g., via an embedded hyperlink) in response to interacting with the content item. Content server 112 may integrate one or more navigation filters with the content item and distribute the content item and the integrated navigation filters to user devices 108. Integrating a navigation filter with a content item may include appending the navigation filter to the content item or replacing a portion of the content item with the navigation filter.

In some implementations, content server 112 is configured to automatically generate navigation filters for a content item using data extracted from the target resource associated with the content item. In other implementations, the navigation filters may be received directly from content providers 106 via a management interface (e.g., used to manage the distribution and attributes of various content items) rather than an automated extraction process.

In some implementations, content server 112 is configured to automatically rank or filter the navigation filters to determine which of the potentially applicable navigation filters to integrate with a content item. In some implementations, the ranking may be based on the keywords of a search query which led to the selection of a particular content item, information associated with user device 108 from with the request for content is received (e.g., interest categories, behavioral information, etc.) and/or the layout or structure of the target resource. In other implementations the ranking and filtering may be specified by content providers 106 rather than an automated ranking process. Content server 112 is described in greater detail with reference to FIG. 2.

Figure 2:
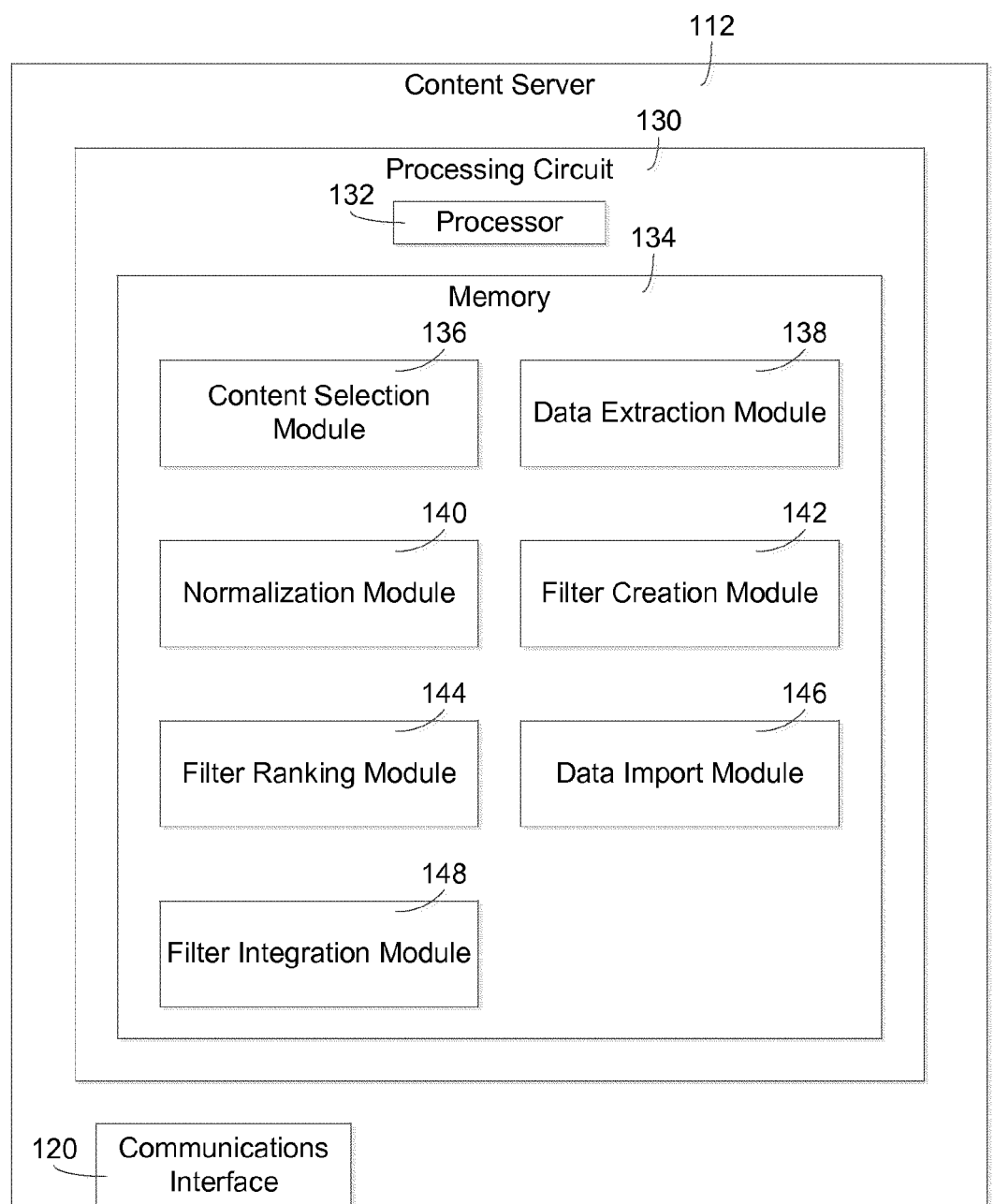
FIG. 2 is a block diagram showing the content server of FIG. 1 in greater detail, illustrating several memory modules configured to extract data from a resource, normalize and filter the extracted data, generate navigation filters associated with the resource, rank a set of navigation filters, and integrate navigation filters with a content item, according to a described implementation.

Referring now to FIG. 2, a block diagram illustrating content server 112 in greater detail is shown, according to a described implementation. Content server 112 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 120 may allow content server 112 to communicate with network 102, resources 104, content providers 106, user devices 108, and data storage devices 110.

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include a content selection module 136, a data extraction module 138, a normalization module 140, a filter creation module 142, a filter ranking module 144, a data import module 146, and a filter integration module 148.

Still referring to FIG. 2, and in greater detail, memory 134 is shown to include a content selection module 136. Content selection module 136 may receive a request for a content item (e.g., via communications interface 120) from resources 104 and/or user devices 108. In some implementations, the request for content items may include characteristics of one or more content slots in which the content items will be displayed. For example, such characteristics may include the URL of the resource 104 in which the content slot is located, a display size of the content slot, a position of the content slot, and/or media types that are available for presentation in the content slot. If the content slot is located on a search results page, keywords associated with the search query may also be provided to content selection module 136. The characteristics of the content slot and/or keywords associated with the content request may facilitate identification of content items that are relevant to resources 104 and/or to the search query.

Content selection module 136 may select an eligible content item in response to the request received from resources 104 or user devices 108. In some implementations, eligible content items include content items having characteristics matching the characteristics of the content slots in which the content items are to be presented. For example, content selection module 136 may select a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, content selection module 136 selects a content item determined to be relevant to particular resource 104, user device 108, or search query. For example, content selection module 136 may select a content item by comparing the keywords associated with each content item (e.g., specified by content providers 106, additional keywords extracted from the content item, etc.) with the keywords associated with the resource 104 or user device 108 requesting the content item. A topic or type of content included in resources 104 may be used to establish keywords for resources 104.

In some implementations, content selection module 136 may select a content item by comparing the keywords associated with each content item with information (e.g., profile data, user interests, user preferences, etc.) associated with a particular user device 108 requesting the content item. In some implementations, content selection module 136 selects a content item based on user profile information independent from a particular user device. For example, if a user device is logged into an online account or profile through a user device, information associated with the account or profile (e.g., demographic information, user interests, user preferences, etc.) may be used to select a content item for distribution to the user device. A user device may be associated with one or more users, user accounts, and/or user profiles. In some implementations, content selection module 136 may select a content item that does not match established user preferences if an insufficient number of preferred content items are available. In some implementations, content selection module 136 may select a content item based on an established click-through-rate, a predicted click-through-rate, a bid price associated with each content item, or other relevant selection criteria.

In some implementations, the selected content item is transmitted to resources 104 for presentation to user devices 108 along with any requested resource content from resources 104. In other implementations, the selected content item is delivered to the user devices 108 directly (e.g., without first transmitting the content item to resources 104) from content server 112 or from data storage devices 110. Content selection module 136 may assign each content item a unique identifier (e.g., a signature attribute) for measuring or recording user interactions with distributed content items.

In some implementations, the content items selected by content selection module 136 may be advertisements. The advertisements may be display advertisements such as image advertisements, Flash® advertisements, video advertisements, text-based advertisements, or any combination thereof. In other implementations, the content items may include other types of content which serve various non-advertising purposes. Content items may be associated with a target resource. For example, content items may include a hyperlink which directs user devices 108 to a specific URL (e.g., a "target URL" given by a href attribute) when the content item is clicked. The target URL of a content item may define the location of the target resource associated with the content item. Content selection module 136 may provide the target URL of the selected content item to data extraction module 138.

Still referring to FIG. 2, memory 134 is shown to include a data extraction module 138. Data extraction module 138 may receive a target URL from content selection module 136 and extract information from the resource defined by the target URL. In some implementations, data extraction module 138 extracts hierarchical information from the target resource. Extracted hierarchical information may be represented as a "menu" including a heading, one or more optionally-linked items, and zero or more submenus. Submenus may be recursively defined. A menu may include literal menus extracted from the target resource as well as other hierarchical structure of the target resource. Data extraction module 138 may store the extracted menus by canonical URL (e.g., by domain name, by entity name, etc.).

In some implementations, data extraction module 138 extracts navigation filter components from the target resource. A single navigation filter may include a heading and a plurality of items associated with the heading. Data extraction module 138 may parse the content and/or structure of the target resource (e.g., a DOM tree, a hierarchical representation, etc.) to extract the headings and the plurality of items associated with each heading. In some implementations, data extraction module 138 extracts textual data from the target resource. The textual data may be extracted from the literal text displayed on the target resource as well as hidden text, metadata, or other textual data associated with the target resource. Data extraction module 138 may also convert non-textual data (e.g., images and other media) into textual data. For example, data extraction module 138 may convert an image of three stars into the text "three stars." The plurality of items may comprise a list of items within the associated heading and/or hyperlinks to resources directly related to the items. The term "items" as used in this description includes both unlinked items and hyperlinked items.

For example, if a user device submits a search query for "DSLR Cameras," a content item linking to a website of a camera retailer may be displayed. Data extraction module 138 may extract headings from the website of the camera retailer and compile a menu describing the varieties of cameras listed on the website. The menu may include the heading "Megapixels" and multiple items within the Megapixels heading describing variation along the Megapixels dimension. For example, a list of items associated with the Megapixels heading may include "Less than 5," "5 to 9," "10 and up," etc. If the items are provided on the camera retailer's website as hyperlinks (e.g., clickable links to a specific portion of the website featuring cameras having the linked attribute), data extraction module 138 may extract the hyperlinks associated with each item.

In some implementations, data extraction module 138 extracts headings and items/links from an indexed version of the target resource (e.g., a previously-crawled or annotated version). The indexed version of the target resource may be created by parsing the raw content of the target resource (e.g., HTML content) into a more easily manipulable form. In some implementations, data extraction module 138 performs XPath-like queries over the indexed version of the target resource to identify elements of interest (e.g. headings and links) Normalized headings may be inferred from the heading content discovered as a result of the XPath-like queries. Items and/or links associated with each heading may be identified by parsing the content of the target resource (e.g., identifying hyperlink URLs, hyperlink text, etc.). In other implementations, headings and links may be specified as literals (e.g., via configuration settings) and the normalized headings can be fixed. Data extraction module 138 may be configured to infer the headings of other menus as items/links are identified. This feature can be used, for example, to create an overarching menu (e.g., a contents menu or hierarchy) that summarizes multiple headings.

In some implementations, data extraction module 138 extracts the headings and items/links (i.e., "navigation filter data") from the target resource prior to receiving the request for content from the user device (e.g., a priori). In some implementations, data extraction module 138 extracts the navigation filter data prior to selecting a content item in response to the request. In some implementations, data extraction module 138 extracts the navigation filter data subsequent to receiving a request for a content item but prior to selecting a content item in response to the request. Advantageously, extracting the navigation filter data prior to receiving a request for content and/or prior to selecting a content item may reduce serving latency (e.g., the time required to generate a content item with integrated navigation filters and provide the content item to a user device).

In some implementations, data extraction module 138 provides the headings and items/links extracted from the target resource to content selection module 136. The extracted headings and items/links may be used as a high-quality signal indicating the content of the target resource. Advantageously, content selection module 136 may use the extracted information to match user query terms and/or interests with relevant content items. For example, the information extracted from a target resource may be stored as keywords associated with the target resource. Content selection module 136 may select a content item linking to the same target resource in response to a search query containing one of the stored keywords.

Still referring to FIG. 2, memory 134 is shown to include a normalization module 140. Normalization module 140 may convert the literal text of the target resource into a standard form. Normalization module 140 may remove extraneous punctuation and numbers, trim whitespace, and standardize casing (e.g., translating Capitalized or CAPS into lowercase, Capitalizing words, etc.). Normalization module 140 may also convert plural terms to singular terms (or vice versa), and strip suffixes or prefixes. For example, the literal text "CAMERAS (4)" may be normalized to simply "Camera."

In some implementations, normalization module 140 may classify headings as one or more of a standard set of heading types (e.g., selected from a predetermined list) and optionally rename the heading based on the standardized heading type. Normalization module 140 may accept configuration settings for activating, deactivating, or customizing various normalization options.

In some implementations, normalization module 140 may perform exclusion filtering of the extracted menus. For example, if the normalization procedure results in an empty normalized text string for a heading or item, normalization module 140 may delete the heading or item. If a menu includes less than a threshold number of items associated with the menu heading (e.g., less than two items), normalization module 140 may delete the menu. Deleting a menu may remove the menu from further consideration as a potential navigation filter. As an alternative to deletion, normalization module 140 may mark an item, heading, or menu in such a way that the item, heading, or menu is disqualified from further consideration. Normalization module 140 may discard headings or items that contain specified strings such as "see more," "see all," or other nonspecific groupings.

Still referring to FIG. 2, memory 134 is shown to include a filter creation module 142. Filter creation module 142 may generate navigation filters from the extracted and normalized menus. In some implementations, filter creation module 142 may accept input from data extraction module 138 and normalization module 140 to generate navigation filters based on the content of the target resource. In other implementations, filter creation module 142 may accept input directly from content providers 106 or resource operators (e.g., via data import module 146) rather than using menus extracted from the target resource.

Filter creation module 142 may use the extracted headings and items to generate navigation filters based on the content of the target resource. Advantageously, filter creation module 142 may create navigation filters having a single heading and a plurality of conceptually parallel items within the heading. In some implementations, the conceptually parallel items may have variation along a single dimension. The dimension of variation may be defined by the heading of the navigation filter. For example, in response to a search query for "desktop hard drives," content selection module 136 may select a content item associated with an online retailer of computer hardware. Filter creation module 142 may identify the heading "Capacity" among the headings extracted from the retailer's landing page and generate a list of conceptually parallel items which vary along the "Capacity" dimension (e.g., 500 GB, 1 TB, 2+TB, etc.). As another example, for the heading "Brands," filter creation module 142 may generate a list of conceptually parallel items which vary along the "Brands" dimension (e.g., Brand A, Brand B, Brand C, etc.).

By ensuring that a navigation filter includes only conceptually parallel items, filter creation module 142 can generate navigation filters which follow the hierarchical structure of the target resource and/or which summarize the content of the target resource in a way that is easy for users to understand. This capability provides a distinct advantage over alternative approaches which group conceptually unrelated items. For example, if a user device submits a search query for "flowers," merely extracting and presenting items from a target resource without assuring that the items vary along only a single dimension could produce a list such as "Roses," "30% off," and "Free Shipping." These items are not conceptually parallel and do not adequately summarize the various types of flowers the target resource has to offer.

Still referring to FIG. 2, memory 134 is shown to include a filter ranking module 144. Filter ranking module 144 may rank both the headings and items of various navigation filters to determine which of the headings and items to include with the selected content item. In some implementations, filter ranking module 144 ranks only the headings or only the items. In other implementations, filter ranking module 144 ranks both the headings and the items. In some implementations, filter ranking module 144 accepts input from filter creation module 142 and ranks the many potential navigation filters extracted from the target resource. In other implementations, filter ranking module 144 receives a set of navigation filters from content providers 106 (e.g., via a management interface) and ranks the multiple potential navigation filters submitted by content providers 106.

In some implementations, filter ranking module 144 references a globally ordered list of headings and ranks potential headings based on the order of the headings in the list. Filter ranking module 144 may be provided with multiple lists corresponding to different interest categories (e.g., vertical categories, topics of interest, etc.). The multiple lists may rank potential headings differently. Filter ranking module 144 may select a list based on the keywords submitted as part of a search query and/or the type or category of the selected content item. For example, a user may find different information useful for camera purchases than for booking a cruise. Filter ranking module 144 may use some or all of the indicators used to select a relevant content item (e.g., interest categories, search keywords, user information, etc.) in selecting a list to rank the navigation filter headings. Headings in the lists may be organized by normalized types (e.g., enum types, categories, etc.) to maintain the manageability of the ordered lists.

In some implementations, filter ranking module 144 ranks navigation filters based on user-dependent and/or query-dependent criteria. For example, if the selected content item is requested in response to a user-submitted search query, filter ranking module 144 may use keywords associated with the search query to rank potential navigation filters. The keywords associated with the search query may be the same or similar keywords used to determine relevant search results and/or select a relevant content item in response to the search query. In some implementations, filter ranking module 144 ranks navigation filters based on user profile information independent from a particular user device. For example, if a user device is logged into an online account or profile through a user device, information associated with the account or profile (e.g., demographic information, user interests, user preferences, etc.) may be used to establish navigation filter rankings A user device may be associated with one or more users, user accounts, and/or user profiles.

Filter ranking module 144 may also consider user-dependent criteria in ranking navigation filters. User-dependent criteria may include profile information associated with the user device to which the selected content item is to be distributed. Profile information may include interest categories or behavioral data associated with the user device (e.g., user demographic information). For example, if a particular user device has only ever clicked on items within the "Style" heading, filter ranking module 144 may rank the "Style" heading above other potential headings. As another example, if a history of search queries or search result selections received from a user device reveals that previous shopping behavior for the user device has been primarily brand-oriented, filter ranking module 144 may rank the "Brand" heading above other potential headings.

Filter ranking module 144 may also rank the conceptually parallel items associated with the navigation filter headings. In some implementations, filter ranking module 144 uses the same or similar criteria to rank items as is used to rank headings (e.g., query-dependent criteria, user-dependent criteria, globally ordered lists, etc.). In some implementations, filter ranking module 144 ranks items within a heading based on the order or appearance of such items on the target resource. For example, items may be ordered in the same order that such items appear on the target resource (e.g., by proximity to the top of the target resource, whether an item is above or below the fold, proximity to the left side or horizontal center of the target resource, etc.), by descending item count within each item (e.g., as indicated by a submenus or lists on the target resource), by number of occurrences of the item on the target resource. In some implementations, filter ranking module 144 ranks items alphabetically, numerically, or according to any other logical criteria.

In some implementations, filter ranking module 144 assigns each navigation filter a score. The score may be based on a weighted average of any of the ranking criteria discussed above, or any other ranking criteria as may be relevant for alternate implementations. The weights assigned to the various ranking criteria may be altered or customized by a customer (e.g., via a management interface). Alternatively, a customer may specify different ranking criteria or submit a globally ordered list ranking potential headings, items, or navigation filters as a whole. Filter ranking module 144 may use the score assigned to each navigation filter to determine which of the navigation filters to include with the selected content item.

Still referring to FIG. 2, memory 134 is shown to include a data import module 146. Data import module 146 may be configured to receive data from content providers 106 or other customers utilizing the services provided by content server 112. Data import module 146 may generate a management interface through which customers can upload some or all of the variables and/or data used to generate and rank navigation filters. For example, data import module 146 may receive a set of menus, headings, and/or items via the management interface. Data import module 146 may use the data received via the management interface to supplement or replace the data extracted from the target resource.

As another example, data import module 146 may receive a set of pre-generated navigation filters to supplement or replace the navigation filters generated by filter creation module 142. Filter ranking module 144 may rank the pre-generated navigation filters in the same manner as the navigation filters created by filter creation module 142 are ranked. The two sets of navigation filters (e.g., created by filter creation module 142 and imported via data import module 146) may be ranked together or separately. In some implementations, filter ranking module 144 can be used as a standalone component to rank navigation filters imported through the management interface and export the rankings to a customer.

In some implementations, data import module 146 may also receive ranking information. The ranking information may include ranking criteria or configuration settings for filter ranking module 144. Alternatively, the ranking information may include ranks assigned by a customer to various potential headings, items, or navigation filters as a whole. The ranking information received via data import module 146 may supplement or replace the rankings determined by filter ranking module 144. Notably, data import module 146 facilitates the de-integration (if desired) of data extraction, normalization, filter creation, and filter ranking functionality. In other words, each component of content server 112 may be implemented as a standalone component which operates on imported data.

Still referring to FIG. 2, memory 134 is shown to include a filter integration module 148. Filter integration module 148 may receive a set of ranked navigation filters from filter ranking module 144 or data import module 146. Filter integration module 148 may also receive the content item selected by content selection module 136. Filter integration module 148 may combine (e.g., attach, append, embed, integrate, include, etc.) one or more of the navigation filters with the selected content item to create a modified content item.

In some implementations, filter integration module 148 selects one or more of the top ranking (e.g., highest scoring, highest priority, etc.) navigation filters (e.g., as determined by filter ranking module 144) for integration with the selected content item. Filter integration module 148 may select the one or more highest ranking navigation filters according to several potential selection strategies. In some implementations, the selection of navigation filters is based on the number of headings and/or items which can fit in a predetermined display space within the content item.

In some implementations, the display size of the predetermined display space may be fixed (e.g., a fixed height and width). For example, the display height of the predetermined display space may have a standard or uniform height of approximately 15 pixels. In other implementations, the display size of the predetermined display space may be partially fixed (e.g., a fixed height and a variable width), or completely variable (e.g., a variable height and a variable width). The display size of the predetermined display space may be based on the display size (e.g., display height, display width, etc.) of the selected content item, the display size of the browser window and/or content slot in which the content item will be presented, the display resolution or screen size of the user device to which the content item will be distributed, or any other criteria affecting an amount of space available for rendering and presenting navigation filters.

In some implementations, filter integration module 148 selects the highest scoring navigation filter and the maximum number of items within the navigation filter which can fit in the predetermined display space. The maximum number of items which can fit in the predetermined display space may depend on the string length (e.g., number of characters) of the navigation filter heading and items within the heading. A second navigation filter can be added if space remains after adding the first navigation filter. As another example, filter integration module 148 may select the two highest scoring navigation filters including the top two scoring items within each of the two highest scoring navigation filters. Filter integration module 148 may select additional items for each of the selected navigation filters (e.g., alternating, evenly, etc.) if space remains after selecting the top two scoring items.

In some implementations, filter integration module 148 truncates headings and/or items to a limited number of characters to conserve display space within the content item. Truncated headings and items may be represented using ellipsis or other marker to indicate that the text was trimmed. Filter integration module 148 may also use an ellipsis or other marker to indicate that not all items for a navigation filter are displayed. For example, if a navigation filter has five items and only two items are displayed, filter integration module 148 may use an ellipsis to indicate that not all variation within the heading is represented in the displayed items. In some implementations, filter integration module 148 selects only navigation filters having at least two visible items (e.g., based on the number of items which would fit into the predetermined display space if the filter were selected). In some implementations, filter integration module 148 selects no more than a threshold number (e.g., one, two, five, etc.) of navigation filters per content item.

Filter integration module 148 may convert the selected navigation filters into HTML extensions for integration with the selected content item. The selected content item and the integrated navigation filters form a modified content item. The modified content item may include display data which causes a user device to render the navigation filters visually when the modified content item is presented via the user device. Filter integration module 148 may cause the navigation filters to be rendered in a variety of different formats, described in greater detail with reference to FIGS. 3-5.

Figure 3:
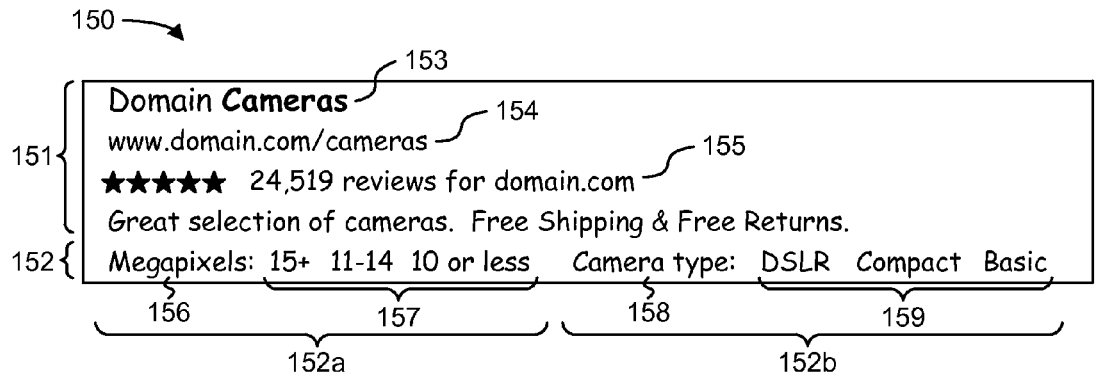
FIG. 3 is a drawing of a content item which has been modified by the content server of FIG. 2 to include a set of informational navigation filters, shown according to a described implementation.
Figure 4:
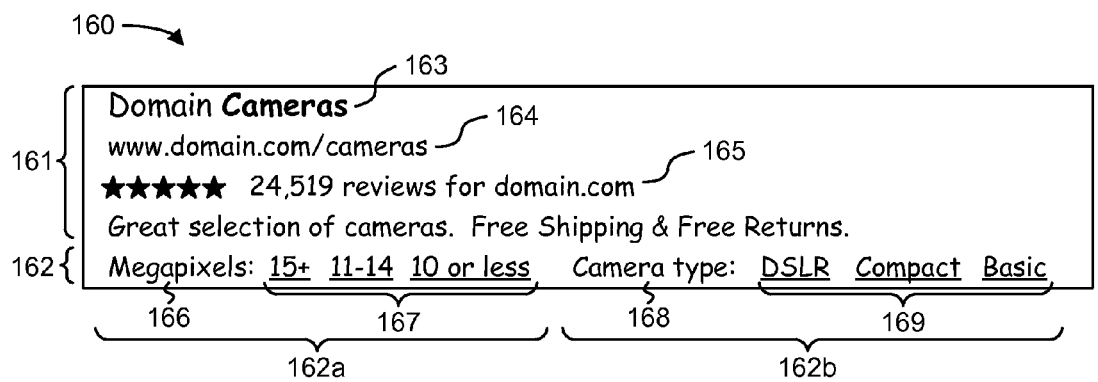
FIG. 4 is a drawing of a content item which has been modified by the content server of FIG. 2 to include a set of linked navigation filters, shown according to a described implementation.
Figure 5:
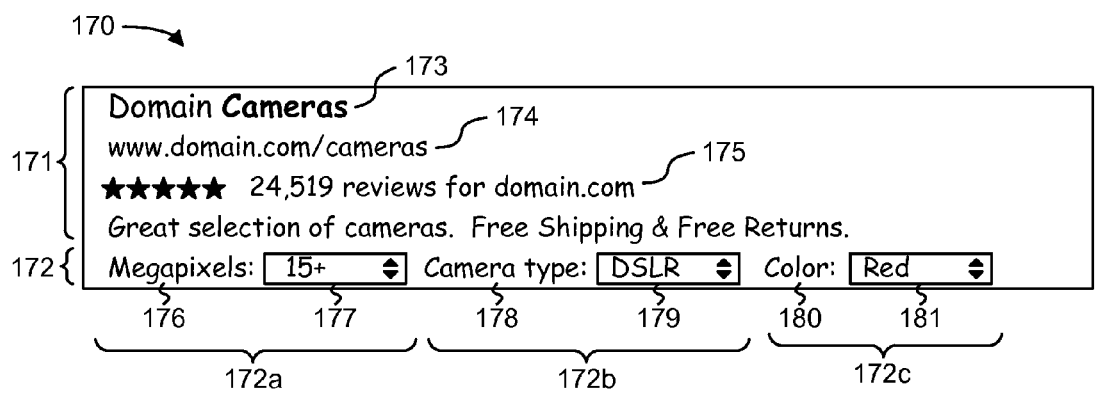
FIG. 5 is a drawing of a content item which has been modified by the content server of FIG. 2 to include a set of dropdown navigation filters, shown according to a described implementation.

Referring now to FIGS. 3-5, several modified content items 150, 160, and 170 are shown, according to a described implementation. Modified content items 150, 160, and 170 illustrate several potential formats with which the navigation filters can be rendered. The illustrated navigation filters are shown to include informational navigation filters 152 (shown in FIG. 3), linked navigation filters 162 (shown in FIG. 4), and dropdown navigation filters 172 (shown in FIG. 5). Although modified content items 150, 160, and 170 are shown as textual content items, the navigation filters can be integrated with any type of content (e.g., display content, image content, Flash® content, etc.). Content items 150, 160, 170 may be displayed in content slots of an electronic resource (e.g., resources 104) or a search results page (e.g., as "sponsored search results"). For example, content items 150, 160, and 170 are shown as generalized content which may be displayed in response to a search query for the term "cameras."

Referring specifically to FIG. 3, a modified content item 150 having informational navigation filters 152 is shown, according to a described implementation. Content item 150 is shown to include a content portion 151 and navigation filters 152. Content portion 151 may include the content originally present in the unmodified content item selected by content selection module 136. For example, content portion 151 is shown to include a title 153, a target URL 154, and an ad creative 155. Title 153 and ad creative 155 may be provided by content providers 106 or automatically generated by content server 112. Target URL 154 may be a hyperlink URL to which a user device is directed upon clicking content item 150.

Navigation filters 152 are informational navigation filters. Informational navigation filters 152 are shown to include a first informational navigation filter 152a and a second informational navigation filter 152b. First informational navigational filter 152a is shown to include a heading 156 (e.g., "Megapixels") and a plurality of items 157 (e.g., "15+," "11-14," "10 or less"). Items 157 may be conceptually parallel items having variation along a single dimension. In some implementations, the dimension of variation for items 157 may be defined by heading 156. Second informational navigational filter 152b is shown to include a heading 158 (e.g., "Camera type") and a plurality of items 159 (e.g., "DSLR,"

"Compact," "Basic"). Items 159 may be conceptually parallel items having variation along a single dimension. In some implementations, the dimension of variation for items 159 may be defined by heading 158.

Informational navigation filters 152 may present items 157 and 159 as unlinked lists. Each unlinked list may follow a heading (e.g., headings 156 and 158 respectively). Informational navigation filters 152 may provide information relating to the content of the target resource (e.g., the resource defined by target URL 154) without introducing additional hyperlinks. In some implementations, headings 156, 158 may be separated from items 157, 159 by a predefined separator (e.g., a colon, a comma, a dash, empty space, etc.). Items 157, 159 within each of headings 156, 158 may be separated from each other by one or more predefined separators. For example, items 157 are shown with space inserted between each of items 157.

Referring now to FIG. 4, a modified content item 160 having linked navigation filters 162 is shown, according to a described implementation. Content item 160 is shown to include a content portion 161 and navigation filters 162. Content portion 161 may include the content originally present in the unmodified content item selected by content selection module 136 and may be the same or similar to content portion 151. For example, content portion 161 is shown to include a title 163, a target URL 164, and an ad creative 165.

Navigation filters 162 are linked navigation filters. Linked navigation filters 162 may be similar to unlinked navigation filters 152. For example, linked navigation filters 162 are shown to include a first linked navigation filter 162a and a second linked navigation filter 162b. First linked navigational filter 162a is shown to include a heading 166 and a plurality of items 167. Second linked navigation filter 162b is shown to include a heading 168 and a plurality of items 169.

Linked navigation filters 162 may present items 167 and 169 as linked lists. For example, items 167, 169 may be rendered as embedded hyperlinks within content item 160. Items 167, 169 may be underlined or otherwise marked to indicate the presence of a hyperlink. In some implementations, each of items 167, 169 includes a hyperlink URL (not shown). The hyperlink URLs associated with items 167, 169 may link to a target resource (or specific portion of a target resource) that filters by the item condition. For example, clicking the item "15+" within "Megapixels" heading 166 may cause a user device to navigate to a specific portion of the target resource which includes information relating to cameras having a "Megapixels" attribute of "15+."

In some implementations, a subset of items 167, 169 may be hyperlinked. For example, one or more of items 167, 169 may be presented as informational items similar to items 157, 159 (e.g., without embedded hyperlinks). Items 167, 169 may include entirely hyperlinked items or a mixture of hyperlinked and non-hyperlinked items. The hyperlinks embedded within items 167, 169 may identify a resource within the domain associated with content item 160 (e.g., "www.domain.com") or outside the domain associated with content item 160.

Referring now to FIG. 5, a modified content item 170 having dropdown navigation filters 172 is shown, according to a described implementation. Content item 170 is shown to include a content portion 171 and navigation filters 172. Content portion 171 may include the content originally present in the unmodified content item selected by content selection module 136 and may be the same or similar to content portions 151 and 161. For example, content portion 171 is shown to include a title 173, a target URL 174, and an ad creative 175.

Navigation filters 172 are dropdown navigation filters. Dropdown navigation filters 172 are shown to include a first dropdown navigation filter 172a, a second dropdown navigation filter 172b, and a third dropdown navigation filter 172c. Each of navigation filters 172 may include a heading (e.g., headings 176, 178, and 180) and a plurality of items within each heading (e.g., items 177, 179, and 181 respectively). The headings for drop down navigation filters 172 may be either in the dropdown portion (as shown in FIG. 5) or outside the dropdown (e.g., in a prefix label) such that only the items are included in the dropdown portion. Advantageously, dropdown navigation filters 172 may reduce the horizontal space required to display a plurality of items by presenting such items as dropdown lists. Dropdown navigation filters 172 are shown to include an additional navigation filter 172c (e.g., "color") not included in content items 150 or 160 due to this horizontal space conservation.

Dropdown navigation filters 172 may allow a user to click on a dropdown list to select any of the plurality of items 177, 179, or 181 within the dropdown list. In some implementations, items 177, 179, 181 may be hyperlinked. The hyperlinks associated with items 177, 179, and 181 may link to a target resource (or specific portion of a target resource) that filters by a condition specified by the hyperlinked item. In some implementations, a subset of items 177, 179, 181 may be hyperlinked. Items 177, 179, 181 may include entirely hyperlinked items or a mixture of hyperlinked and non-hyperlinked items.

Figure 6:
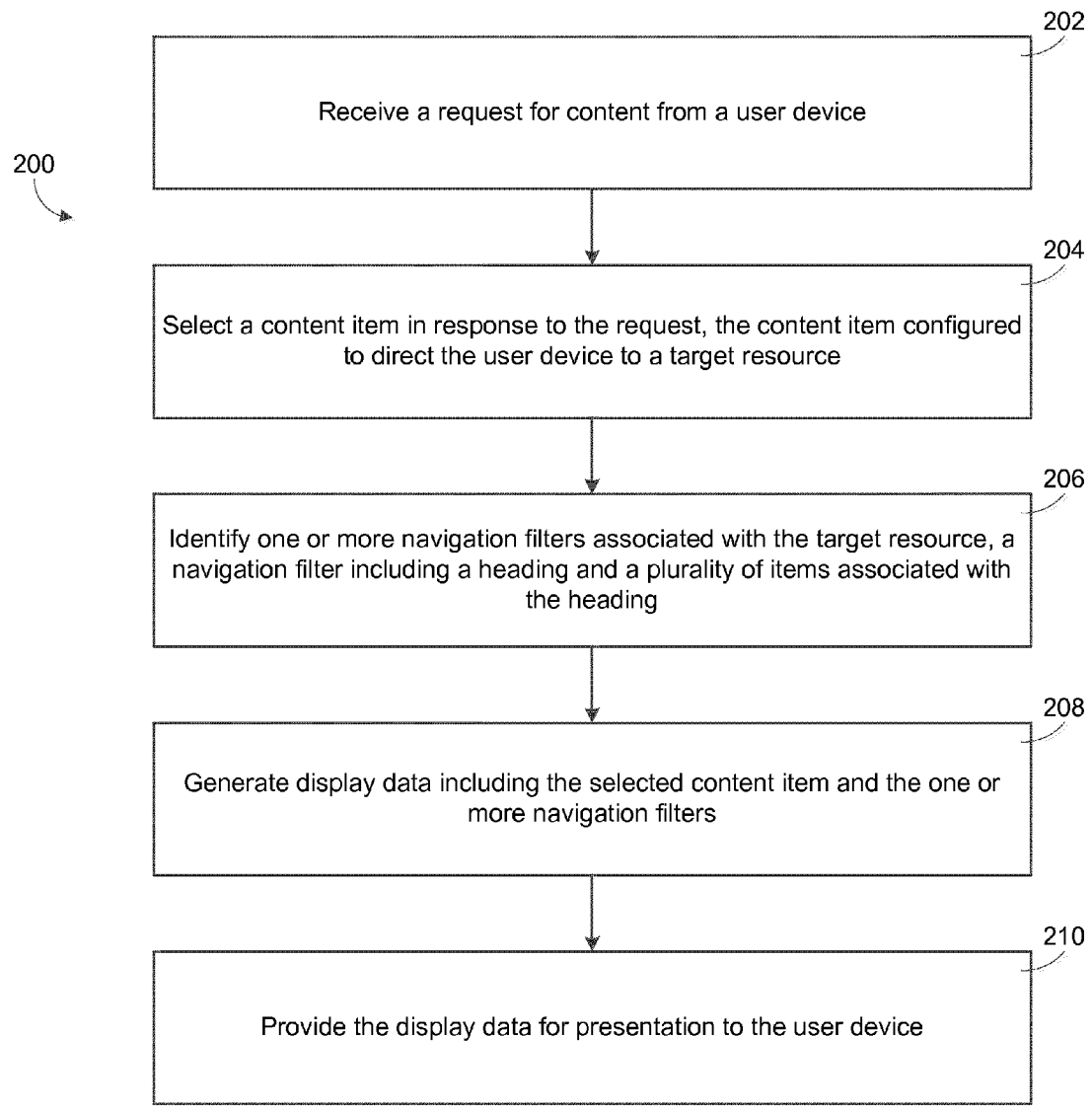
FIG. 6 is a flowchart of a process for integrating navigation filters with content items distributed via a computer network, shown according to a described implementation.

Referring now to FIG. 6, a flowchart of a process 200 for integrating navigation filters with content items distributed via a computer network is shown, according to a described implementation. Process 200 may be performed by one or more servers (e.g., content server 112, a separate content integration server, etc.) using one or more memory modules 136-148, as described with reference to FIG. 2.

Process 200 is shown to include receiving a request for content from a user device (step 202). The request for content may be received by content selection module 136 via communications interface 120. In some implementations, the request for content is received from user devices 108 upon viewing resource content having an embedded content slot. The request for content may include characteristics of the content slot in which the requested content will be displayed. For example, such characteristics may include the URL of the resource 104 in which the content slot is located, a display size of the content slot, a position of the content slot, and/or media types that are available for presentation in the content slot.

In some implementations, the request for content is received from user devices 108 as part of a search query. For example, the requested content may include sponsored search results or third-party content items displayed on a search results page. The request for content may include keywords associated with the search query or information pertaining to the user device from which the request for content is received. Advantageously, such information can assist in identifying content items which are relevant to a particular search query, resource, or user device.

Still referring to FIG. 2, process 200 is shown to include selecting a content item in response to the request (step 204). Step 204 may be performed by content selection module 136. In some implementations, the selected content item is an advertisement. The advertisement may be a display advertisement such as an image advertisement, a Flash® advertisement, a video advertisement, a text-based advertisement, or any combination thereof. In other implementations, the selected content item may include other types of content which serve various non-advertising purposes.

In some implementations, step 204 includes selecting a content item having characteristics matching the characteristics of a content slot in which the content item will be presented. For example, content selection module 136 may select a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, step 204 includes selecting a content item determined to be relevant to particular resource 104, user device 108, or search query. For example, content selection module 136 may select a content item by comparing the keywords associated with each content item (e.g., specified by content providers 106, additional keywords extracted from the content item, etc.) with the keywords associated with the user device requesting the content item.

In some implementations, step 204 involves selecting a content item by comparing the keywords associated with each content item with information (e.g., profile data, user interests, user preferences, etc.) associated with the user device requesting the content item. In some implementations, content selection module 136 selects a content item that does not match established user preferences if an insufficient number of preferred content items are available. In some implementations, content selection module 136 selects a content item based on an established click-through-rate, a predicted click-through-rate, a bid price associated with each content item, or other relevant selection criteria.

The selected content item may be associated with a target resource. For example, the selected content item may include a hyperlink which directs user devices 108 to a specific resource (e.g., a "target URL" given by a href attribute) when the content item is clicked. The target URL of a content item may define the location of the target resource associated with the content item.

Still referring to FIG. 6, process 200 is shown to include identifying one or more navigation filters associated with the target resource (step 206). A navigation filter may include a heading and a plurality of items associated with the heading. In some implementations, the plurality of items are conceptually parallel items having variation along a single dimension. The dimension of variation may be defined by the heading of the navigation filter.

In some implementations, the navigation filters are extracted from the target resource (e.g., using data extraction module 138, as described above). The extraction may be performed either prior to or subsequent to either step 202 or step 204. In other implementations, the navigation filters may be imported (e.g., using data import module 146) via a management interface. For example, the navigation filters may be provided by content providers 106 rather than generated from data extracted from the target resource. In some implementations, the navigation filters may be normalized and/or ranked according to ranking criteria. The normalization and/or ranking may be performed by content server 112 (e.g., normalization module 140, filter ranking module 144) or the navigation filters may be received in a pre-normalized/pre-ranked form (e.g., from content providers 106).

Still referring to FIG. 6, process 200 is shown to include generating display data including the selected content item and the one or more navigation filters (step 208). Step 208 may involve selecting one or more of the top ranking (e.g., highest scoring, highest priority, etc.) navigation filters (e.g., as determined by filter ranking module 144) for integration with the selected content item. In some implementations, step 208 is performed by filter integration module 148 as described with reference to FIG. 2. Filter integration module 148 may select one or more top ranking navigation filters according to several potential selection strategies. For example, navigation filters may be selected based on the amount of display space available in the content item, the string length of potential headings, and/or the rankings assigned to the various navigation filter headings and items within each heading. Step 208 may be performed either prior to or subsequent to either step 202 or step 204.

In some implementations, step 208 includes converting the selected navigation filters into HTML extensions and integrating the HTML extensions with the content item. The selected content item and the integrated navigation filters may be combined to form a modified content item. The modified content item may include display data which causes a user device to render the navigation filters visually when the modified content item is presented via the user device. The navigation filters may be integrated with the content item in a variety of different formats including informational navigation filters (e.g., shown in FIG. 3), linked navigation filters (e.g., shown in FIG. 4), and dropdown navigation filters (e.g., shown in FIG. 5). In some implementations, the navigation filters are integrated with the content item such that the navigation filters are displayed adjacent to the primary "creative" portion of the content item.

Still referring to FIG. 6, process 200 is shown to include providing the display data for presentation to the user device (step 210). Step 210 may be performed by content server 112 using communications interface 120. The modified content comprising the display data item may be distributed from content server 112 to user devices 108 via network 102. The modified content item may be rendered by user devices 108 and presented visually through a user interface element (e.g., an electronic display) thereof. Several examples of rendered content items are shown and described with reference to FIGS. 3-5.

Figure 7:
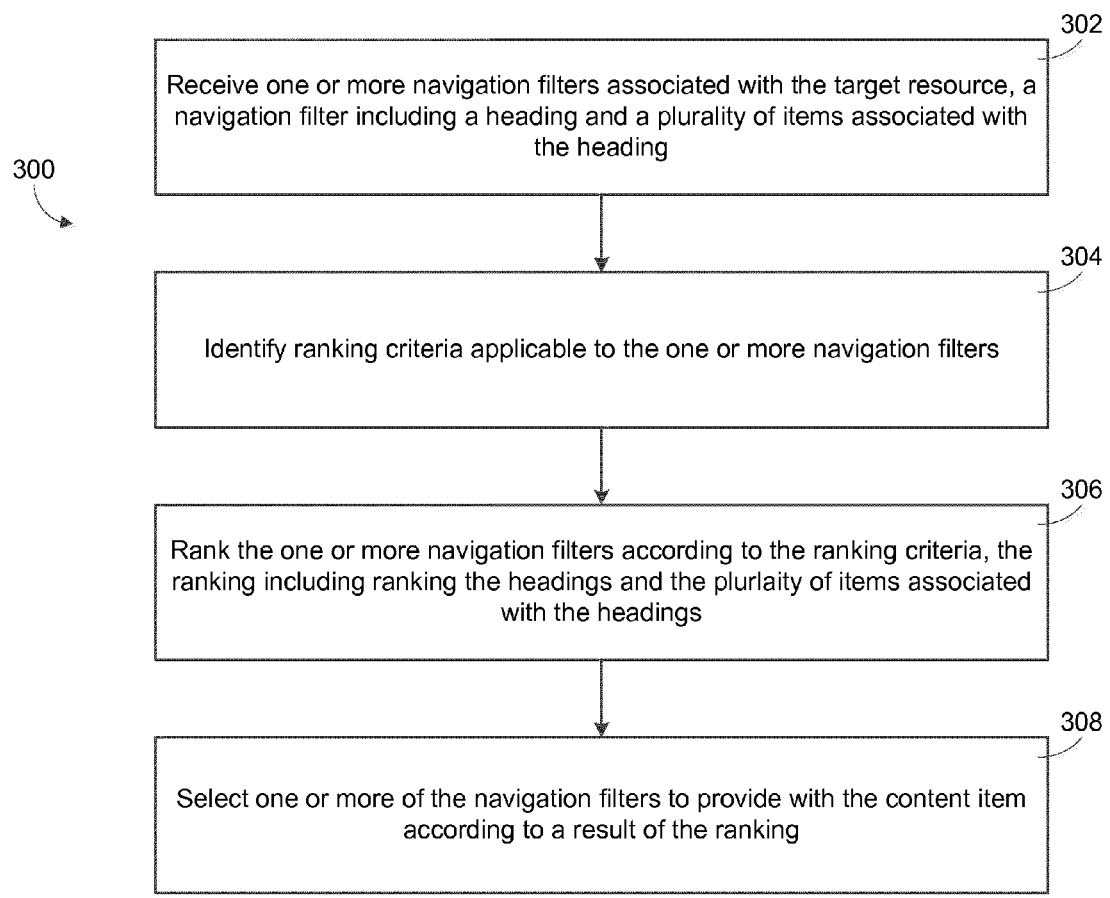
FIG. 7 is a flowchart of a process for ranking and selecting navigation filters for integration with a content item distributed via a computer network, shown according to a described implementation.

Referring now to FIG. 7, a flowchart of a process 300 for ranking and selecting navigation filters to provide with a content item distributed via a computer network is shown, according to a described implementation. Process 300 may be performed by one or more servers (e.g., content server 112, a separate filter ranking server, etc.) using one or more of the memory modules 136-148 described with reference to FIG. 2.

Process 300 is shown to include receiving one or more navigation filters associated with a target resource (step 302). A navigation filter may include a heading and a plurality of items associated with the heading. In some implementations, the plurality of items are conceptually parallel items having variation along a single dimension. The dimension of variation may be defined by the heading of the navigation filter.

In some implementations, the navigation filters are extracted from the target resource (e.g., using data extraction module 138, as described above). In other implementations, the navigation filters may be imported (e.g., using data import module 146) via a management interface. For example, the navigation filters may be provided by content providers 106 rather than generated from data extracted from the target resource. In some implementations, headings and items comprising the navigation filters may be normalized. The normalization may be performed by content server 112 (e.g., normalization module 140) or the navigation filters may be received in a pre-normalized form (e.g., from content providers 106).

Still referring to FIG. 7, process 300 is shown to include identifying ranking criteria applicable to the one or more navigation filters (step 304). In some implementations, the ranking criteria are query-dependent. For example, if the selected content item is requested in response to a user-submitted search query, the ranking criteria may include keywords associated with the search query. The keywords associated with the search query may be the same or similar keywords used to determine relevant search results and/or select a relevant content item in response to the search query.

In some implementations, the ranking criteria are user-dependent. User-dependent criteria may include profile information associated with the user device to which the selected content item is to be distributed. Profile information may include interest categories or behavioral data associated with the user device. For example, if a particular user device has only ever clicked on items within the "Style" heading, the ranking criteria may indicate that the "Style" heading should be ranked above other potential headings. As another example, if a history of search queries or search result selections received from a user device reveals that previous shopping behavior for the user device has been primarily brand-oriented, the ranking criteria may indicate that the "Brand" heading should be ranked above other potential headings.

In some implementations, the ranking criteria are based on one or more globally ordered lists. The headings and items may be ranked according to the order that the headings and items appear on the globally ordered list. In some implementations, multiple lists may be used. The multiple lists may correspond to different interest categories (e.g., vertical categories, topics of interest, etc.) and may rank potential headings/items differently. Step 304 may include selecting a list based on the keywords submitted as part of a search query and/or the type or category of the selected content item. For example, a user may find different information useful for camera purchases than for booking a cruise. Some or all of the indicators used to select a relevant content item (e.g., interest categories, search keywords, user information, etc.) may be used in selecting a list to rank the navigation filter headings. Headings in the lists may be organized by normalized types (e.g., enum types, categories, etc.) to maintain the manageability of the ordered lists Still referring to FIG. 7, process 300 is shown to include ranking the one or more navigation filters according to the ranking criteria (step 306). Step 306 may include ranking the headings and the plurality of items associated with the headings. The headings may be ranked according to globally ordered lists, user-dependent ranking criteria, and/or query-dependent ranking criteria as provided above. In some implementations, the plurality of items may be ranked using the same or similar ranking criteria used to rank the headings.

In some implementations, step 306 includes ranking items within a heading based on the order or appearance of such items on the target resource. For example, item ranks may be ordered (e.g., from top ranked to bottom ranked) in the same order that such items appear on the target resource (e.g., by proximity to the top of the target resource, whether an item is above or below the fold, proximity to the left side or horizontal center of the target resource, etc.), by descending item count within each item (e.g., as indicated by a submenus or lists on the target resource), or by number of occurrences of the item on the target resource. In other implementations, items may be ranked alphabetically, numerically, or according to any other logical criteria.

In some implementations, step 306 includes assigning each navigation filter a score. The score may be based on a weighted average of any of the ranking criteria discussed above, or any other ranking criteria as may be relevant for alternate implementations. The weights assigned to the various ranking criteria may be altered or customized by a customer (e.g., via a management interface). Alternatively, a customer may specify different ranking criteria or submit a globally ordered list ranking potential headings, items, or navigation filters as a whole.

Still referring to FIG. 7, process 300 is shown to include selecting one or more of the navigation filters according to a result of the ranking (step 308). In some implementations, the selection of navigation filters is based on the number of headings and/or items which can fit in a predetermined display space within the content item. Step 308 may include determining an amount of display space within the content item for displaying the navigation filters.

In some implementations, the display size of the display space may be fixed (e.g., a fixed height and width). For example, the display height of the predetermined display space may have a standard or uniform height of approximately 15 pixels. In other implementations, the display size of the display space may be partially fixed (e.g., a fixed height and a variable width), or completely variable (e.g., a variable height and a variable width). The display size of the display space may be based on the display size (e.g., display height, display width, etc.) of the selected content item, the display size of the browser window and/or content slot in which the content item will be presented, the display resolution or screen size of the user device to which the content item will be distributed, or any other criteria affecting an amount of space available for rendering and presenting navigation filters.

In some implementations, step 308 includes selecting the top ranking (e.g., highest scoring) heading and a maximum number of items associated with the top ranking heading. The maximum number of items may be defined by the maximum number of items which can fit in the display space. The maximum number of items may depend on the string length (e.g., number of characters) of the navigation filter heading and items within the heading as well as the display size of the display space.

In some implementations, step 308 includes selecting a plurality top ranking headings and a pair of items associated with each of the top ranking headings. Step 308 may include adding additional items to each of the selected pairs of items until the available space for displaying the navigation filters is filled. In some implementations, items may be added to each navigation filter evenly (e.g., alternating between navigation filters, sequentially for each of the selected navigation filters, etc.) until the space for displaying the selected navigation filters is filled.

In some implementations, step 308 includes selecting only navigation filters having at least two visible items (e.g., based on the number of items which would fit into the predetermined display space if the filter were selected). In some implementations, step 308 involves selecting no more than a threshold number (e.g., one, two, five, etc.) of navigation filters per content item.

As defined herein, a "subset" includes some or all of the members of a set within which the subset is contained (i.e., the "set"). A subset may be a proper subset (e.g., including less than all of the members of the set) or a mathematical subset (e.g., including less than or all of the members of the set).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for ranking and selecting navigation filters to provide with a third party content item delivered via a computer network, the method comprising:

receiving, at one or more servers, a plurality of navigation filters associated with a resource, at least some of the navigation filters including a heading and a plurality of items associated with the heading;

identifying, by the one or more servers, ranking criteria applicable to the plurality of navigation filters;

ranking, according to the ranking criteria and by the one or more servers, the one or more navigation filters by ranking at least one of the headings and the plurality of items associated with the headings; and selecting, according to a result of the ranking and by the one or more servers, one of the plurality of navigation filters to provide with the third-party content item by:

determining an amount of space available in the modified content item for displaying the navigation filters;

selecting a top ranking heading according to a result of the ranking; and selecting a maximum number of items associated with the top ranking heading, based on the amount of space available in the modified content item for displaying the navigation filters.

2. The method of claim 1, wherein the plurality of items associated with the heading are conceptually parallel items, wherein the conceptually parallel items vary along a dimension defined by the heading.

3. The method of claim 1, wherein the modified content item is delivered to a user device, wherein the ranking criteria are based on at least one of: information pertaining to the user device to which the modified content item is delivered and information pertaining to a search query received from the user device.

4. The method of claim 1, wherein the ranking criteria are based on a globally ordered list, wherein ranking the one or more navigation filters includes ranking at least one of the headings and the plurality of items according to an order provided by the globally ordered list.

5. The method of claim 1, wherein selecting one or more of the navigation filters includes:

selecting, for each navigation filter, a subset of the plurality of items associated with the navigation filter heading, according to a result of the ranking; and selecting a subset of the navigation filters to combine with the third-party content item.

6. The method of claim 1, further comprising:

extracting the headings and the plurality of items from a resource;

organizing the plurality of items into one or more sets of conceptually parallel items; and generating the plurality of navigation filters by associating each of the sets of conceptually parallel items with one of the headings.

7. The method of claim 6, wherein the plurality of items are organized into one or more sets of conceptually parallel items according to a structure of the resource from which the plurality of items are extracted.

8. The method of claim 1, wherein at least one of the items in the selected navigation filter is associated with a target resource and is presented in the selected navigation filter as a hyperlink to the target resource.

9. The method of claim 1, wherein the selected navigation filter comprises a dropdown menu including at least one of the heading and the plurality of items associated with the heading.

10. The method of claim 9, wherein at least one of the items in the drop down menu is associated with a target resource, the method further comprising:

directing a user device to the target resource in response to a user selection of an item from the dropdown menu via the user device.

11. A method for ranking and selecting navigation filters to provide with a third party content item delivered via a computer network, the method comprising:

receiving, at one or more servers, a plurality of navigation filters associated with a resource, at least some of the navigation filters including a heading and a plurality of items associated with the heading;

identifying, by the one or more servers, ranking criteria applicable to the plurality of navigation filters;

ranking, according to the ranking criteria and by the one or more servers, the plurality of navigation filters by ranking at least one of the headings and the plurality of items associated with the headings; and selecting, according to a result of the ranking and by the one or more servers, one of the navigation filters to provide with the third-party content item by:

determining an amount of space available in the modified content item for displaying the navigation filters;

selecting a plurality of top ranking headings according to a result of the ranking;

selecting a pair of items associated with each of the top ranking headings; and adding an item to each of the selected pairs of items until the amount of space available in the modified content item for displaying the navigation filters is filled.

12. The method of claim 11, wherein the plurality of items associated with the heading are conceptually parallel items, wherein the conceptually parallel items vary along a dimension defined by the heading.

13. The method of claim 11, wherein the modified content item is delivered to a user device, wherein the ranking criteria are based on at least one of: information pertaining to the user device to which the modified content item is delivered and information pertaining to a search query received from the user device.

14. The method of claim 11, wherein the ranking criteria are based on a globally ordered list, wherein ranking the one or more navigation filters includes ranking at least one of the headings and the plurality of items according to an order provided by the globally ordered list.

15. The method of claim 11, wherein selecting one or more of the navigation filters includes:

selecting, for each navigation filter, a subset of the plurality of items associated with the navigation filter heading, according to a result of the ranking; and selecting a subset of the navigation filters to combine with the third-party content item.

16. The method of claim 11, further comprising:

extracting the headings and the plurality of items from a resource;

organizing the plurality of items into one or more sets of conceptually parallel items; and generating the plurality of navigation filters by associating each of the sets of conceptually parallel items with one of the headings.

17. The method of claim 16, wherein the plurality of items are organized into one or more sets of conceptually parallel items according to a structure of the resource from which the plurality of items are extracted.

18. The method of claim 11, wherein at least one of the items in the selected navigation filter is associated with a target resource and is presented in the selected navigation filter as a hyperlink to the target resource.

19. The method of claim 11, wherein the selected navigation filter comprises a dropdown menu including at least one of the heading and the plurality of items associated with the heading.

20. The method of claim 19, wherein at least one of the items in the drop down menu is associated with a target resource, the method further comprising:

directing a user device to the target resource in response to a user selection of an item from the dropdown menu via the user device.

* * * * *